United States Patent
Wang et al.

(10) Patent No.: US 6,525,115 B2
(45) Date of Patent: Feb. 25, 2003

(54) METHOD OF MAKING AN AQUEOUS DISPERSION OF PARTICLES COMPRISING AN EPOXY MATERIAL FOR USE IN COATINGS

(75) Inventors: Yongcai Wang, Webster, NY (US); Kurt M. Schroeder, Spencerport, NY (US); James L. Bello, Rochester, NY (US); Kevin M. O'Connor, Webster, NY (US)

(73) Assignee: Eastman Kodak Company, Rochester, NY (US)

( * ) Notice: Subject to any disclaimer, the term of this patent is extended or adjusted under 35 U.S.C. 154(b) by 24 days.

(21) Appl. No.: 09/730,523

(22) Filed: Dec. 5, 2000

(65) Prior Publication Data

US 2002/0107306 A1 Aug. 8, 2002

(51) Int. Cl.⁷ .............................. C08K 3/34; C08L 63/02
(52) U.S. Cl. ........................ 523/466; 523/406; 523/408; 523/409; 523/412; 523/459; 525/329.7; 525/385
(58) Field of Search ................................. 523/406, 408, 523/409, 412, 459, 466; 525/329.7, 385

(56) References Cited

U.S. PATENT DOCUMENTS

| 2,801,171 | A | 7/1957 | Fierke et al. |
| 2,835,579 | A | 5/1958 | Thirtle et al. |
| 2,949,360 | A | 8/1960 | Julian |
| 4,247,439 | A | 1/1981 | Matthews et al. |
| 4,446,258 | A | 5/1984 | Chu et al. |
| 5,741,835 | A | 4/1998 | Stark |
| 5,853,926 | A | 12/1998 | Bohan et al. |
| 5,856,051 | A | 1/1999 | Yau et al. |

FOREIGN PATENT DOCUMENTS

EP          933384      *   8/1999

* cited by examiner

*Primary Examiner*—Robert Dawson
*Assistant Examiner*—D. Aylward
(74) *Attorney, Agent, or Firm*—Chris P. Konkol

(57) ABSTRACT

The present invention relates to a method of making an aqueous dispersion of particles comprising epoxy-functional and acid-functional materials. Coating compositions made from such a dispersion can be used to protect various substrates, including imaging layers, so that the coated product resists fingerprints, common stains, and spills.

19 Claims, No Drawings

METHOD OF MAKING AN AQUEOUS DISPERSION OF PARTICLES COMPRISING AN EPOXY MATERIAL FOR USE IN COATINGS

FIELD OF THE INVENTION

The present invention relates to a method of making an aqueous dispersion of particles comprising epoxy-functional and acid-functional materials. Coating compositions made from such a dispersion can be used to protect various substrates.

BACKGROUND OF THE INVENTION

Aqueous dispersions of epoxy-containing particles have been prepared by various methods known in the art. One such method of preparing an aqueous dispersions is the so-called "inverse emulsification" technique such as disclosed in U.S. Pat. No. 5,741,835 to Stark. The process typically involves melting an epoxy compound and a surfactant together. Optionally a base is added to the melt. Hot water is then slowly added to the epoxy melt at vigorous agitation until inversion takes place, from a water in oil to an oil in water mixture, after which additional water can be added. Stark states that the invention provides a stable good aqueous dispersion having an average particle size of preferably less than about 2 $\mu$m, more preferably less than about 1 $\mu$m.

U.S. Pat. No. 4,446,258 to Chu et al. discloses dispersing the reaction product of an epoxy resin and an acid polymer. Preferably, the ionic epoxy-resin-acid polymer product is dispersed in water with an ammonia or an amine, to neutralize the polymer product, in the presence of a polymeric surfactant.

Such water-borne products of carboxy-functional polymers and epoxy-functional polymers have been widely used in coatings for decorative and/or protective purposes, for example, in the fields of architectural, automotive, and industrial coatings. Such coatings have general utility for coating metallic and various other substrates and articles, including, for example, metallic cans. As mentioned in U.S. Pat. No. 4,247,439 to Matthews et al. such coatings can provide, for example, corrosion resistance, gloss, hydrolytic stability, non-adulterating of foods and beverages in contact therewith.

Particle dispersions of photographically useful compounds have been prepared using an evaporated solvent technique. For example, U.S. Pat. No. 2,801,171; U.S. Pat. No. 2,835,579; and U.S. Pat. No. 2,949,360 disclose a suspension technique that involves dissolving a particle material in a water immiscible solvent, dispersing the solution as fine liquid droplets in an aqueous solution, and removing the solvent by evaporation or other suitable means.

In the field of imaging, there have been attempts over the years to provide a protective coating for gelatin based photographic products that will protect the images from damage by water or aqueous solutions. A number of patents describe methods of solvent coating a protective layer on the image after photographic processing is completed, for example, U.S. Pat. Nos. 2,259,009, 2,331,746, 2,798,004, 3,113,867, 3,190,197, 3,415,670 and 3,733,293. A drawback for a solvent coating method is the health and environmental concern of those chemicals to the coating operator.

A number of patents have been directed to water-resistant protective coatings that can be applied to a photographic element prior to development. U.S. Pat. No. 5,853,926 to Bohan et al. discloses a protective coating for a photographic element, involving the application of an aqueous coating comprising polymer particles and a soft polymer latex binder. This coating allows for appropriate diffusion of photographic processing solutions, and does not require a coating operation after exposure and processing. The hydrophobic polymer particles must be fused to form a protective coating that is continuous and water-impermeable. U.S. Pat. No. 5,856,051 describes the use of hydrophobic particles with gelatin as the binder in an overcoat formulation. This invention demonstrated an aqueous coatable, water-resistant protective overcoat that can be incorporated into the photographic product, and allows for appropriate diffusion of photographic processing solutions. The hydrophobic polymers exemplified in U.S. Pat. No. 5,856,051 include polyethylene having a melting temperature (Tm) of 55 to 200° C. A layer comprised of such polymers is capable of becoming water-resistant by fusing the layer at a temperature higher than the Tm of the polymer, after the sample has been processed to generate the image.

An objective of the present invention is to provide an improved method of making an aqueous dispersion involving epoxy-containing particles for use in a coating composition that can be used to cover and protect various substrates. It is desirable that one such use be to protect imaged elements such as photographic or other prints, so that the coated product resists fingerprints, common stains, and spills.

SUMMARY OF THE INVENTION

The present invention relates to a method of making an aqueous dispersion of particles comprising epoxy-functional and acid-functional materials for use in coating compositions. Such coatings can be used to protect various substrates including photographic prints.

The method of making an aqueous dispersion of epoxy-functional particles comprises (a) dissolving into a volatile solvent mixture an oil-soluble epoxy-functional resin and a polymer having acid groups, preferably characterized by an acid number between 30 and 200, wherein the volatile solvent mixture comprises a water-immiscible organic solvent as the major component and a water-miscible organic solvent as a minor component; (b) adding to the organic solvent medium a base to neutralize the acid groups to a degree of neutralization less than 95%; (c) dispersing the resulting organic phase into an aqueous medium; and (d) removing the volatile solvent mixture. In one embodiment, the thus produced epoxy-containing particles comprise (1) at least 50%, by dry weight of the particle, of a solid epoxy resin, which particles having a glass transition temperature of greater than 20° C. and a mean particle size of not more than 500 nm, and (2) a polymer having acid groups. Optionally, further components such as binders, surfactants, lubricants, thickeners, or other additives may also be present in the dispersion or coating made therefrom.

Another aspect of the invention provides a method of forming a coating by applying a coating composition according to the present invention to a substrate and drying the composition to produce a clear or colored coating that protects the substrate from environmental damage.

DESCRIPTION OF THE PREFERRED EMBODIMENTS

The present invention provides a simple and inexpensive way to make an aqueous dispersion of epoxy-containing particles. In accordance with the invention, a coating composition comprising such particles can be applied over a substrate. For example, an overcoat formulation according to the present invention can be applied to the emulsion side of photographic products, particularly photographic prints that may encounter frequent handling and abuse by end users.

In one embodiment, a preferred method of making epoxy-containing particles for use in a coating composition according to the present invention comprises (1) dissolving into a volatile solvent mixture an oil-soluble epoxy-functional compound and a polymer having an acid number greater than 30 and less than 250, preferably greater than 60 and less than 150, and optionally a surfactant, (2) adding to the organic solvent mixture a base to neutralize the acid groups to a degree of neutralization less than 95%, preferably less than 90%, (3) dispersing the resulting organic phase into an aqueous medium optionally containing a surfactant, and (4) removing the volatile solvent mixture. Preferably, the volatile solvent mixture comprises a water immiscible organic solvent as the major component and a water miscible organic solvent as a minor component. Such a process advantageously provides very fine submicron particles having a narrow particle size distribution. The average particle size is less than 500 nm. This contributes to improved coating properties. The dispersions also have excellent stability during storage.

Suitably, in steps (1), (2) and (3), the temperature is essentially maintained at a temperature of under about 50° C., preferably under 35° C., such that the epoxy functionality remains substantially unreacted. Suitably, in step (4), the temperature is maintained at a temperature under about 100° C., preferably under 80° C., such that the epoxy functionality remains substantially unreacted. Advantageously, in some cases, the process may be conducted at about room temperature. In any case, the temperature should be such that the epoxy functionality is substantially maintained (unreacted), as can be determined by differential scanning calorimetry (DSC), comparing the DSC of particles to fully reacted particles (subject to a temperature greater than 100° C.).

Preferably, the volatile solvent mixture comprises at least 60 percent, more preferably at least 80 percent, by volume, of a water immiscible organic solvent, wherein water immiscible means the solubility in water is less than 3, preferably less than 2% by volume. Preferably, the volatile solvent mixture comprises at less than 20 percent by volume of a water miscible organic solvent, wherein water miscible means the solubility in water is at least 10 percent, preferably at least 20 percent.

Suitable immiscible organic solvents include, for example: methyl acetate, ethyl acetate, n-propyl acetate, isobutyl acetate, n-butyl alcohol, chloroform, carbon tetrachloride, ethylene chloride, sec-butyl acetate, cyclohexanone, n-amyl alcohol, diethyl ether, methyl-n-propyl ketone, benzene, toluene, xylene, butoxyethyl acetate.

Suitable miscible organic solvents include, for example: acetone, methyl ethyl ketone, ethyl alcohol, methyl alcohol, isopropyl alcohol, n-propyl alcohol, tetrahydrofuran, ethylene glycol monomethyl ether, N-methylpyrrolidone, dimethylformamide, dimethyl sulfoxide, butyldiethoxy alcohol, dipropylene glycol methyl ether, In the present method, the volatiles in the final step are preferably removed from the water-solvent mixture by evaporation or heating, such as using IR sources. Other techniques to remove volatiles include vacuum.

Optionally, various dispersants and surfactants known in the art can be used as stabilizers in forming the aqueous dispersion. The dispersants can be nonionic, anionic, and cationic, and can be polymeric and are used as high as 20% of the epoxy resin. Because such surfactants are potential of causing other problems, the minimum amount of surfactant should be used. If the dispersion of epoxy material coagulates or coalesces, then addition of measured amounts of surfactant to freshly prepared dispersions or to the aqueous phase preparatory to formation of the dispersion can be used to assess the stability of the dispersion. Most preferably, the dispersion will be stable with regards to sedimentation of the epoxy-containing dispersed phase. However, in the context of the subject invention, the term "stable" refers to a dispersion where the epoxy resin particles do not coalesce or coagulate, but remain substantially in distinct particles. If such particles sediment upon storage, they may be easily redispersed by shaking or moderate agitation. If, however, the particles coalesce, they cannot be redispersed without high shear mixing for prolonged periods of time.

The solvent for the final dispersion, as sold or applied, comprises primarily water, suitably at least 50 percent, preferably 80 percent by weight water.

Another aspect of the invention is directed to a method of making a coating composition comprising the above-described dispersion and optionally combining the dispersion with a polymeric binder. The coating composition may consist of the dispersion alone or combined with other ingredients. Preferably, the dispersed particles are combined or mixed with a polymeric binder. Suitable polymeric binders include, but are not limited to, water soluble polymers or colloidal polymeric particles prepared by emulsion polymerization or by emulsifying pre-formed polymers in water using a proper dispersing method or using a proper dispersing agent. Suitable emulsion-polymerized particles comprise addition-type polymers and copolymers prepared from ethylenically unsaturated monomers such as acrylates including acrylic acid, methacrylates including methacrylic acid, acrylamides and methacrylamides, itaconic acid and its half esters and diesters, styrenes including substituted styrenes, acrylonitrile and methacrylonitrile, vinyl acetates, vinyl ethers, vinyl and vinylidene halides, and olefins. In addition, crosslinking and graft-linking monomers such as 1,4-butylene glycol methacrylate, trimethylolpropane triacrylate, allyl methacrylate, diallyl phthalate, divinyl benzene, and the like may be used. Other suitable polymeric binders include film-forming dispersions of polyurethanes or polyester ionomers.

The above-described dispersion, the polymeric binder, or both may include reactive functional groups capable of forming covalent bonds by intermolecular crosslinking or by reaction with a crosslinking agent (i.e., a hardener). Suitable reactive functional groups include: hydroxyl, carboxyl, carboduimide, epoxide, aziridine, vinyl sulfone, sulfinic acid, active methylene, amino, amide, allyl, and the like.

The coating compositions in accordance with the invention may also contain suitable crosslinking agents that may effectively be used in the coating compositions of the invention including aldehydes, epoxy compounds, polyfunctional aziridines, vinyl sulfones, methoxyalkyl melamines, triazines, polyisocyanates, dioxane derivatives such as dihydroxydioxane, carbodiimides, chrome alum, and zirconium sulfate, and the like. The crosslinking agents may react with functional groups present on either the above-described dispersion, the polymeric binder, or on both.

Suitably, the epoxy-containing particles are present in the coating composition in an amount of at least 10% by dry weight. Preferably, the weight ratio of the water-dispersible epoxy-containing particles to the polymeric binder is between 90:10 to 10:90, more preferably, at least in some embodiments, 50:50 and 80:20, depending on whether the binder is water-soluble or a water-dispersible hydrophobic particle or latex.

Compositions according to the present invention can also be used to form a durable environmental resistant coating. The composition can be used for maintenance coatings for architectural structures and for finishing the exterior of automobiles and trucks. The composition can be pigmented to form a colored finish or unpigmented for use as a clearcoat.

The composition can be applied as a top coat to a substrate by conventional techniques such as spraying. The resulting coating can be dried and cured at elevated temperature of greater than 100° C., preferably 100 to 150° C. Coatings can be applied to architectural surfaces and appliances to from a finish typically about 0.05 to 5 mils thick.

To improve the weatherability of the coating made from the coating composition, about 0.1 to 5% by weight, based on the weight of solids, of an ultraviolet light stabilizer or combinations thereof, can be added. These stabilizers include ultraviolet light absorbers, screeners, quenchers and specific hindered amine light stabilizers. Also, about 0.1 to 5% by weight, based on the solids weight, of an antioxidant can be used. Typical ultraviolet light stabilizers that are useful are listed, for example, in U.S. Pat. No. 4,906,677.

Another aspect of the invention is directed to a method of coating a substrate comprising coating a substrate with a coating composition comprising the afore-described dispersion and heating the applied coating to promote reaction of the epoxy functionalities. Suitable, the coating is less than 125 microns thick, preferably less than 25 microns.

The aqueous dispersions can be used to make coating compositions, wherein the coating composition can be used to coat various substrates, either to provide a transparent protective layer or to provide a colored layer comprising a pigment. Substrates may include, for example, a floor, wall, appliance, automobile, or part thereof. In one embodiment, the substrate is an imaging element. Therefore, another aspect of the present invention relates to a method of making an imaging element having a protective overcoat, wherein the protective overcoat is made from a coating composition comprising epoxy-functional particles, said particles having been formed by the above described method.

The epoxy-containing particles comprises a material, typically a resin, having a 1,2-epoxy functionality, more particularly, having on average greater than about 1.5 epoxide groups per molecule (on a measured basis). The epoxy material can be saturated or unsaturated, linear or branched, aliphatic, cycloaliphatic, aromatic or heterocyclic, and may bear substituents which do not materially interfere with the reaction with the carboxylic acid. Such substituents can include bromine or fluorine. The epoxy material may be monomeric or polymeric. Suitable epoxy resins include glycidyl ethers prepared by reacting epichlorohydrin with a compound containing at least 1.5 aromatic hydroxyl groups carried out under alkaline reaction conditions. Examples of other epoxy resins suitable for use in the invention include diglycidyl ethers of dihydric compounds, epoxy novolacs (substituted or unsubstituted phenyl-containing epoxy materials) and cycloaliphatic epoxies. Generally, epoxy resins contain a distribution of compounds with a varying number of repeat units.

Preferably, the epoxy material is a resin that is a diglycidyl ether of a dihydric phenol, a diglycidyl ether of a hydrogenated dihydric phenol, an aliphatic glycidyl ether, an epoxy novolac, or a cycloaliphatic epoxy. Diglycidyl ethers of dihydric phenols can be produced, for example, by reacting an epihalohydrin with a dihydric phenol in the presence of an alkali. Examples of suitable dihydric phenols include: 2,2-bis(4-hydroxyphenyl) propane(bisphenol-A); 2,2-bis(4-hydroxy-3-tert-butylphenyl) propane; 1,1-bis(4-hydroxyphenyl) ethane; 1,1-bis(4-hydroxyphenyl) isobutane; bis(2-hydroxy-1-naphthyl) methane; 1,5-dihydroxynaphthalene; 1,1-bis(4-hydroxy-3-alkylphenyl) ethane and the like. Suitable dihydric phenols can also be obtained from the reaction of phenol with aldehydes such as formaldehyde (bisphenol-F). Diglycidyl ethers of dihydric phenols include advancement products of the above diglycidyl ethers of dihydric phenols with phenolic compounds such as bisphenol-A, such as those described in U.S. Pat. Nos. 3,477,990 and 4,734,468. Diglycidyl ethers of hydrogenated dihydric phenols can be produced, for example, by hydrogenation of dihydric phenols followed by glycidation reaction with an epihalohydrin in the presence of a Lewis acid catalyst and subsequent formation of the glycidyl ether by reaction with sodium hydroxide.

Aliphatic glycidyl ethers can be produced, for example, by reacting an epihalohydrin with an aliphatic diol in the presence of a Lewis acid catalyst followed by conversion of the halohydrin intermediate to the glycidyl ether by reaction with sodium hydroxide. Examples of suitable aliphatic glycidyl ethers include for example, diglycidyl ethers of 1,4 butanediol, neopentyl glycol, cyclohexane dimethanol, hexanediol, polypropylene glycol, and like diols and glycols; and triglycidyl ethers of trimethylol ethane and trimethylol propane. Epoxy novolacs can be produced by condensation of formaldehyde and a phenol followed by glycidation by reaction of an epihalohydrin in the presence of an alkali. The phenol can be, for example, phenol, cresol, nonylphenol and t-butylphenol. Cycloaliphatic epoxies can be produced by epoxidizing a cycloalkene-containing compound with greater then one olefinic bond with peracetic acid.

Commercial examples of preferred epoxy resins include, for example, EPON™ resin 1001F, 1002F, 1004F, 1007F, 1009F, 2002, 2003, 2004, 2005, 2012, 2014, 2024, 2042, 3001, 3002 available from Shell Chemical Company, and epoxy cresol novolac resin (poly((o-cresyl glycidyl ether)-co-formaldehyde)) available from Sigma-Aldrich Chemical Co.

As indicated above, the water-dispersible epoxy particles comprise, in addition to the epoxy material, a substantially amorphous, thermoplastic polymer having carboxylic acid groups, which polymer can be characterized by the acid number, which is preferably greater than or equal to 30 and relatively permeable to water at a pH of greater than 7. Preferably, the acid number is less than or equal to 200, more preferably less than or equal to 100.

The carboxylated thermoplastic polymers utilized in this invention are preferably prepared by conventional free radical polymerization techniques from at least one ethylenically unsaturated monomer and at least one ethylenically unsaturated acid monomer. The choice of the unsaturated monomer(s) is dictated by the intended end use of the coating composition and is practically unlimited. A variety of acid monomers can be used. Their selection is dependent on the desired final polymer properties.

This acid monomer can be an ethylenically unsaturated acid, monoprotic or diprotic, anhydride or monoester of a dibasic acid, which is copolymerizable with the other monomer(s) used to prepare the polymer. The most preferred acid monomers are acrylic acid, methacrylic acid, and itaconic acid.

The acid number of the carboxylated thermoplastic polymers is between 30 and 250, preferably between 30 and 200. The acid number is the number of milligrams of potassium hydroxide required to neutralize one gram of the polymer. For purposes of illustration, an acid number of 100 corresponds to the presence in the polymer of either 12.8% acrylic acid, 15.3% of methacrylic acid, 11.5% of itaconic acid, or 10.3% of maleic or fumaric acid.

Ethylenically unsaturated monomers which can be used for preparing the carboxylated thermoplastic polymers of the invention include virtually all monomers capable of undergoing addition polymerization to produce polymers free of ionic charge groups and essentially water-insoluble. Typical useful monomers thus include, for example, methyl methacrylate, ethyl .methacrylate, butyl methacrylate, ethyl acrylate, butyl acrylate, hexyl acrylate, n-octyl acrylate, lauryl methacrylate, 2-ethylhexyl methacrylate, nonyl acrylate, benzyl methacrylate, 2-hydroxypropyl methacrylate acrylonitrile, methacrylonitrile, vinyl acetate, vinyl propionate, vinylidene chloride, vinyl chloride, styrene, t-butyl styrene, vinyl toluene, butadiene, isoprene, and the like.

The polymerization process is initiated in general with free radical initiators. Free radicals of any sort may be used. Preferred initiators include persulfate, peroxides, azo compounds, and redox initiators. The amount of initiator can vary from 0.01% to 2% by the weight of monomer, but is preferably from 0.03 to 1% by weight thereof. Organic peroxides and organic peresters include, for example, benzoyl peroxide, dichlorobenzoyl peroxide, dicumyl peroxide, di-tert-butyl peroxide, lauroyl peroxide, tert-butyl peracetate, 2,5-dimethyl-2,5-di(tert-butylperoxy)hexine-3, 2,5-dimethyl-2,5-di(tert-butylperoxy)hexane, tert-butyl perbenzoate, tert-butyl perphenyl acetate, tert-butylperisobutylate, tert-butyl per-secoctoate, tert-butyl perpivalate, cumyl perpivalate and tert-butyl perdiethyl acetate, and azo compounds include, for example, azobisisobutylnitrile and dimethyl azoisobutylate.

In one particular embodiment, the present invention provides a method of making an improved overcoat formulation for the imaging side of an imaging element or material, including photographic prints, which encounter frequent handling and abuse by end users. Such an overcoat formulation of this invention can comprise 30 to 95% by weight (based on the dry laydown of the overcoat) of water-dispersible epoxy-containing particles of 0.01 to 0.5 micrometers in average size and 5 to 70% by weight of a hydrophilic polymer which is substantially uncrosslinked (based on the dry laydown of the overcoat). The epoxy-containing particles further comprise a polymer having an acid number greater than 30 and less than 250, wherein the acid groups carried by the polymer have been neutralized by a base to a degree of neutralization of 50 to 95%. In one embodiment a photographic element is made comprising: (a) a support; (b) at least one silver-halide emulsion layer superposed on a side of said support; and overlying the silver emulsion layer, (c) a processing-solution-permeable (nascently protective) overcoat having a laydown of at least 0.54 g/m$^2$ (50 mg/ft$^2$) made from the above-described overcoat formulation.

In one especially preferred embodiment, the overcoat composition may contain a water-soluble, hydrophilic polymer that typically is substantially non-crosslinked to facilitate its washing out during processing and, at least to some extent, to facilitate the coalescence of the water-dispersible epoxy-containing particles. The overcoat composition of the photographic element comprises 30 to 95% by weight of solids, preferably 60 to 90 weight percent, of water-dispersible epoxy-containing polymer particles having an average particle size of less than 500 nm and a $T_g$ of greater than 20° C., preferably from 20° C. to 70° C., and 5 to 70%, by weight of solids, preferably 10 to 40 weight percent, of a water-soluble hydrophilic polymer such that more than 30 weight percent of the water-soluble polymer is washed out during photographic processing; wherein the weight ratio of the water-dispersible epoxy-containing particles to the hydrophilic polymer is from 20:80 to 95:5, preferably from 40:60 to 90:10, more preferably between 50:50 and 80:20, whereby the overcoat forms a water-resistant overcoat after photoprocessing without fusing, namely by maintaining the photographic element at temperature less than 100° C. Preferably, the hydrophilic polymer is non-crosslinked and substantially water-soluble. The epoxy-containing particles of the invention have a mean size of less than 5 microns, preferably less than 2 microns, and most preferably less than 0.5 microns, and further comprise a polymer having an acid number greater than 30 and less than 250, wherein the acid groups carried by the polymer have been neutralized by a base to a degree of neutralization of 50 to 95%.

The protective overcoat preferably comprises, in addition to the water-dispersible epoxy particles described above, at least one water-soluble hydrophilic polymer as a binder. Examples of such water-soluble polymers that may be added include polyvinyl alcohol, cellulose ethers, poly(N-vinyl amides), polyacrylamides, polyesters, poly(ethylene oxide), dextrans, starch, uncrosslinked gelatin, whey, albumin, poly (acrylic acid), poly(ethyl oxazolines), alginates, gums, poly (methacrylic acid), poly(oxymethylene), poly (ethyleneimine), poly(ethylene glycol methacrylate), poly (hydroxy-ethyl methacrylate), poly(vinyl methyl ether), poly(styrene sulfonic acid), poly(ethylene sulfonic acid), poly(vinyl phosphoric acid) and poly(maleic acid) and the like. Such materials are included in "Handbook of Water-Soluble Gums and Resins" by Robert 1. Davidson (McGraw-Hill Book Company, 1980) or "Organic Colloids" by Bruno Jirgensons (Elsvier Publishing Company, 1958). In a preferred embodiment, the polymer is polyvinyl alcohol, which polymer has been found to yield coatings that are relatively uniform and to enhance the diffusion rate of the developer into the underlying emulsions, in the case of photographic elements.

A preferred hydrophilic polymer is polyvinyl alcohol. The term "polyvinyl alcohol" referred to herein means a polymer having a monomer unit of vinyl alcohol as a main component. Polyvinyl alcohol is typically prepared by substantial hydrolysis of polyvinyl acetate. Such a "polyvinyl alcohol" includes, for example, a polymer obtained by hydrolyzing (saponifying) the acetate ester portion of a vinyl acetate polymer (exactly, a polymer in which a copolymer of vinyl alcohol and vinyl acetate is formed), and polymers obtained by saponifying a trifluorovinylacetate polymer, a vinyl formate polymer, a vinyl pivalate polymer, a tert-butylvinylether polymer, a trimethylsilylvinylether polymer, and the like (the details of "polyvinyl alcohol" can be referred to, for example, "World of PVA", Edited by the Poval Society and Published by Kobunshi Kankoukai, Japan, 1992 and "Poval", Edited by Nagano et al. and Published by Kobunshi Kankoukai, Japan, 1981). The degree of hydrolysis (or saponification) in the polyvinyl alcohol is preferably at least about 70% or more, more preferably at least about 80%. Percent hydrolysis refers to mole percent. For example, a degree of hydrolysis of 90% refers to polymers in which 90 mole% of all copolymerized monomer units of the polymer are vinyl alcohol units. The remainder of all monomer units consists of monomer units such as ethylene, vinyl acetate, vinyl trifluoroacetate and other comonomer units which are known for such copolymers. Most preferably, the polyvinyl alcohol has a weight average molecular weight (MW) of less than 150,000, preferably less than 100,000, and a degree of hydrolysis greater than 70%. If the MW is greater than 100,000, the degree of hydrolysis is preferably less than 95%. Preferably, the degree of hydrolysis is 85 to 90% for a polyvinyl alcohol having a weight average MW of 25,000 to 75,000. These preferred limitations may provide improved manufacturability and processibility. The polyvinyl alcohol is selected to make the coating wettable, readily processable, and in a substantial amount, to readily, not sluggishly, come out of the coating during processing, thereby yielding the final water-resistant product. The optimal amount of polyvinyl alcohol depends on the amount of dry coverage of water-dispersible polymer. In one preferred embodiment of the invention, the polyvinyl alcohol is present in the overcoat in the amount between 1 and 60 weight percent of the water-dispersible polymer, preferably between 5 and 50 weight percent of the water-dispersible polymer, most preferably between 10 and 45 weight percent of the water-dispersible polymer.

Without wishing to be bound by theory, it is believed that the water-soluble polymer and water-dispersible polymer form a biphasic mixture, which allows the formation of a water-resistant overcoat that does not require fusing, merely elevated temperatures preferably up to about 60° C. It is believed that fusing is not required for several reasons: (a) the substantial absence of cross-linked gelatin and other such crosslinked polymers, and (b) the selection of a water-dispersible polymer that is believed to form a biphasic system with the hydrophilic water-soluble polymer, but which after processing forms a water-resistant overcoat. The optimal amount of the water-soluble polymer may depend on the amount of dry coverage of water-dispersible epoxy particles.

For the coating composition, it has long been known that rheological additives, which are added at only a relatively small weight percentage to aqueous coating systems, can modify the coating rheology to satisfy various coating application requirements. Aqueous systems so modified have included latex paints, protective coatings, paper coatings, household detergents, cosmetics and personal care items, adhesives and sealants, inks, drilling fluids, and the like.

Rheological additives are thixotropes which impart a three dimensional network to liquid systems as expressed by increased viscosity at low shear rates. When the system is sheared at high shear rates, this network is broken down, resulting in a decrease in viscosity; the network recovers when the external force is removed. Rheological additives are added at about 0.01% to about 10% (depending on the thickener, the characteristics of the system to be thickened and the desired rheological profile) based on the total weight of the system to be thickened. Often the terms thixotrope, thickener, and rheological additive are used interchangeably.

Many rheological additives for aqueous based systems are available: natural, modified natural and synthetic. Natural rheological additives include guar gum, pectin, casein, carrageanan, xanthan gum and alginates. Modified additives include modified celluloses, most particularly methyl cellulose, hydroxyethyl cellulose, hydroxypropyl cellulose, and carboxymethyl cellulose.

A particular useful family of thickeners for the present invention is the associative thickeners. The use of this class of thickeners in the overcoat coating compositions of the invention improves the overcoat water and stain resistances of the coatings for photographic elements as described above. Other classes of thickeners have a negative impact on the overcoat water and stain resistance after photographic processing.

Associative thickeners (polymers), according to the definition thereof which is given in the Encyclopedia of Polymer Science and Engineering, 2nd edition, 17, 772–779, are water-soluble polymers containing nonpolar groups which assemble into aggregates in polar media. They consist of a backbone comprising predominantly units of a hydrophilic nature and a minority of hydrophobic sequences. When such structures are placed in aqueous solution, their hydrophobic poles undergo association, in order to limit the interactions between water and hydrophobic sequences. The formation of such physical crosslinking nodes can result in the creation of a real network. The physical gel thus formed considerably increases the viscosity of the water. In the case of an aqueous composition comprising polymer particles, associative polymers also act by creating various bonds between themselves and polymer particles.

The known associative polymers capable of imparting these characteristics include polyurethane associative thickeners and acrylic associative thickeners.

Polyurethane associative agents are polymers of essentially triblock structure, that is to say molecules consisting of three separate portions, the polymerized hydrophilic central portion and two hydrophobic ends, identical or otherwise. The central hydrophilic portion consists of a number of polyether, generally polyethylene oxide, chains. The end portions consist of hydrophobic groups such as, for example, alkyl, aryl or alkylaryl groups. Polyurethane associative polymers are obtained by condensation chemistry. Such agents are described in many patents, as, for example, in patents U.S. Pat. No. 3,770,684, U.S. Pat. No. 4,079,028 and U.S. Pat. No. 4,155,892. Such associative thickeners are commercially available from, for example, Condea Servo BV® as SER-AD FX® 1010, 1050, 1070, and 1100, and Rohm and Hass Company as Accusol®880 and 882.

Acrylic associative agents have a different structure, that of a hydrophilic chain along which pendent hydrophobic units are distributed randomly. They are obtained by copolymerization of a functional monomer of the ethylenic carboxylic acids type, optionally esters of these acids and/or other monomers carrying hydrophilic groups, and of ethylenic monomers carrying a hydrophobic side chain, for example a polyether chain like a polyethylene oxide, comprising a hydrocarbon hydrophobic end radical. Acrylic associative polymers are thus encountered in which the functional monomer is a surfactant alcohol acrylate or methacrylate (patents EP 0,013,836 and U.S. Pat. No. 4,384,096), an oxyethylenated ester of crotonic acid (U.S. Pat. No. 4,569,965), a half-ester of maleic anhydride (patent EP 0,248,621) or a surfactant ether of allyl alcohol (patent EP 0,216,479) or else the result of the condensation of a surfactant alcohol and of an isocyanate containing ethylenic unsaturation (patents U.S. Pat. No. 4,514,552, U.S. Pat. No. 4,600,761 and EP 0,350,414). All these acrylic associative polymers are obtained by radical polymerization. Such associative thickeners are commercially available from, for example, Union Carbide Corporation as TR® 115, 116, and 117. The preferred associative thickeners for the practice of the invention are the polyurethane associative thickeners.

In the coating an imaging element, the overcoat should be clear, i.e., transparent, and is preferably colorless. But it is specifically contemplated that the overcoat can have some color for the purposes of color correction, or for special effects, so long as it does not detrimentally affect the formation or viewing of the image through the overcoat. Thus, there can be incorporated into the polymer a dye that will impart color or tint. In addition, additives can be incorporated into the polymer that will give the overcoat various desired properties. For example, a UV absorber may be incorporated into the polymer to make the overcoat UV absorptive, thus protecting the image from UV induced fading. Other compounds may be added to the coating composition, depending on the functions of the particular layer, including surfactants, emulsifiers, coating aids, lubricants, matte particles, crosslinking agents, antifoggants, inorganic fillers such as conductive and nonconductive metal oxide particles, pigments, magnetic particles, biocide, and the like. The coating composition may also include a small amount of organic solvent, preferably the concentration of organic solvent is less than 1 percent by weight of the total coating composition. The invention does not preclude coating the desired polymeric material from a volatile organic solution or from a melt of the polymer.

Examples of surfactants as coating aids include any surface-active material that will lower the surface tension of the coating preparation sufficiently to prevent edge-withdrawal, repellencies, and other coating defects. These include alkyloxy- or alkylphenoxypolyether or polyglycidol derivatives and their sulfates, such as nonylphenoxypoly (glycidol) available from Olin Matheson Corporation or sodium octylphenoxypoly(ethyleneoxide) sulfate, organic sulfates or sulfonates, such as sodium dodecyl sulfate, sodium dodecyl sulfonate, sodium bis(2-ethylhexyl) sulfosuccinate (Aerosol® OT), and alkylcarboxylate salts such as sodium decanoate.

The surface characteristics of the overcoat are in large part dependent upon the physical characteristics of the polymers which form the continuous phase and the presence or absence of solid, nonfusible particles. However, the surface characteristics of the overcoat also can be modified by the conditions under which the surface is optionally fused. For example, in contact fusing, the surface characteristics of the fusing element that is used to fuse the polymers to form the continuous overcoat layer can be selected to impart a desired degree of smoothness, texture or pattern to the surface of the clement. Thus, a highly smooth fusing element will give a glossy surface to the imaged element, a textured fusing element will give a matte or otherwise textured surface to the element, a patterned fusing element will apply a pattern to the surface of the element, etc.

Matte particles well known in the art may also be used in the coating composition of the invention, such matting agents have been described in *Research Disclosure* No. 308119, published December 1989, pages 1008 to 1009. When polymer matte particles are employed, the polymer may contain reactive functional groups capable of forming covalent bonds with the binder polymer by intermolecular crosslinking or by reaction with a crosslinking agent in order to promote improved adhesion of the matte particles to the coated layers. Suitable reactive functional groups include hydroxyl, carboxyl, carboduimide, epoxide, aziridine, vinyl sulfone, sulfinic acid, active methylene, amino, amide, allyl, and the like.

In order to reduce the sliding friction of the photographic elements in accordance with this invention, the overcoat composition may contain fluorinated or siloxane-based components and/or the coating composition may also include lubricants or combinations of lubricants. Typical lubricants include (1) silicone based materials disclosed, for example, in U.S. Pat. Nos. 3,489,567, 3,080,317, 3,042,522, 4,004,927, and 4,047,958, and in British Patent Nos. 955,061 and 1,143,118; (2) higher fatty acids and derivatives, higher alcohols and derivatives, metal salts of higher fatty acids, higher fatty acid esters, higher fatty acid amides, polyhydric alcohol esters of higher fatty acids, etc., disclosed in U.S. Pat. Nos. 2,454,043; 2,732,305; 2,976,148; 3,206,311; 3,933,516; 2,588,765; 3,121,060; 3,502,473; 3,042,222; and 4,427,964, in British Patent Nos. 1,263,722; 1,198,387; 1,430,997; 1,466,304; 1,320,757; 1,320,565; and 1,320,756; and in German Patent Nos. 1,284,295 and 1,284,294; (3) liquid paraffin and paraffin or wax like materials such as camauba wax, natural and synthetic waxes, petroleum waxes, mineral waxes, silicone-wax copolymers and the like; (4) perfluoro- or fluoro- or fluorochloro-containing materials, which include poly(tetrafluoroethylene), poly(trifluorochloroethylene), poly(vinylidene fluoride, poly(trifluorochloroethylene-co-vinyl chloride), poly(meth) acrylates or poly(meth)acrylamides containing perfluoroalkyl side groups, and the like. Lubricants useful in the present invention are described in further detail in *Research Disclosure* No.308119, published December 1989, page 1006.

Imaging elements made by the method of this invention can be of many different types depending on the particular use for which they are intended. Details with respect to the composition and function of a wide variety of different imaging elements are provided in U.S. Pat. No. 5,300,676 and references described therein. Such elements include, for example, photographic, electrophotographic, electrostatographic, photothermographic, migration, electrothermographic, dielectric recording, thermal-dye-transfer, and ink jet recording imaging elements. Layers of imaging elements other than the image-forming layer are commonly referred to auxiliary layers. There are many different types of auxiliary layers such as, for example, subbing layers, backing layers, interlayers, overcoat layers, receiving layers, stripping layers, antistatic layers, transparent magnetic layers, and the like.

Support materials for an imaging element often employ auxiliary layers comprising glassy, hydrophobic polymers such as polyacrylates, polymethacrylates, polystyrenes, or cellulose esters, for example. One typical application for such an auxiliary layer is as a backing layer to provide resistance to abrasion, scratching, blocking, and ferrotyping. Such backing layers may be applied directly onto the support material, applied onto a priming or "subbing" layer, or applied as an overcoat for an underlying layer such as an antistatic layer, transparent magnetic layer, or the like. For example, U.S. Pat. No. 4,203,769 describes a vanadium pentoxide-containing antistatic layer that is overcoated with a cellulosic layer applied from an organic solvent. U.S. Pat. Nos. 4,612,279 and 4,735,976 describe organic solvent-applied layers comprising a blend of cellulose nitrate and a copolymer containing acrylic acid or methacrylic acid that serve as overcoats for antistatic layers.

The thickness of the support is not critical. Support thicknesses of 2 to 15 mils (0.002 to 0.015 inches) can be used. Biaxially oriented support laminates can be used with the present invention. These supports are disclosed in commonly owned U.S. Pat. Nos. 5,853,965, 5,866,282, 5,874,205, 5,888,643, 5,888,681, 5,888,683, and 5,888,714, incorporated in their entirety by reference herein. These supports include a paper base and a biaxially oriented polyolefin sheet, typically polypropylene, laminated to one or both sides of the paper base. At least one photosensitive silver halide layer is applied to the biaxially oriented polyolefin sheet.

The coating composition made according to the invention can be applied by any of a number of well known techniques, such as dip coating, rod coating, blade coating, air knife coating, gravure coating and reverse roll coating, extrusion coating, slide coating, curtain coating, and the like. After coating, the layer is generally dried by simple evaporation, which may be accelerated by known techniques such as convection heating. Known coating and drying methods are described in further detail in *Research Disclosure* No. 308119, Published December 1989, pages 1007 to 1008. Preferably, a commercial embodiment involves simultaneous co-extrusion. The laydown of the overcoat will depend on its field of application. For a photographic element, the laydown of the polyurethane-containing copolymer is suitably at least 0.54 g/m$^2$ (50 mg/ft$^2$), preferably 1.08 to 5.38 g/m$^2$ (100 to 500 mg/ft$^2$), most preferably 1.61 to 3.23 g/m$^2$ (150 to 300 mg/ft$^2$). After applying the coating composition to the imaging element, it may be dried over a suitable period of time, for example 2 to 4 minutes.

Photographic elements can contain conductive layers incorporated into multilayer photographic elements in any of various configurations depending upon the requirements of the specific photographic element. Preferably, the conductive layer is present as a subbing or tie layer underlying a magnetic recording layer on the side of the support opposite the photographic layer(s). However, conductive layers can be overcoated with layers other than a transparent magnetic recording layer (e.g., abrasion-resistant backing layer, curl control layer, pelloid, etc.) in order to minimize the increase in the resistivity of the conductive layer after overcoating. Further, additional conductive layers also can be provided on the same side of the support as the photographic layer(s) or on both sides of the support. An optional conductive subbing layer can be applied either underlying or overlying a gelatin subbing layer containing an antihalation dye or pigment. Alternatively, both antihalation and antistatic functions can be combined in a single layer containing conductive particles, antihalation dye, and a binder. Such a hybrid layer is typically coated on the same side of the support as the sensitized emulsion layer. Additional optional layers can be present as well. An additional conductive layer can be used as an outermost layer of a photographic element, for example, as a protective layer overlying an image-forming layer. When a conductive layer is applied over a sensitized emulsion layer, it is not necessary to apply any intermediate layers such as barrier or adhesion-promoting layers between the conductive overcoat layer and the photographic layer(s), although they can optionally be present. Other addenda, such as polymer latices to improve dimensional stability, hardeners or cross-linking agents, surfactants, matting agents, lubricants, and various other well-known additives can be present in any or all of the above mentioned layers.

While a primary purpose of applying an overcoat to imaged elements in accordance with this invention is to protect the element from physical damage, application of the overcoat may also protect the image from fading or yellowing. This is particularly true with elements that contain images that are susceptible to fading or yellowing due to the action of oxygen. For example, the fading of dyes derived from pyrazolone and pyrazoloazole couplers is believed to be caused, at least in part, by the presence of oxygen, so that the application of an overcoat which acts as a barrier to the passage of oxygen into the element will reduce such fading.

Photographic elements can be imagewise exposed using a variety of techniques. Typically exposure is to light in the visible region of the spectrum, and typically is of a live image through a lens. Exposure can also be to a stored image (such as a computer stored image) by means of light emitting devices (such as LEDs, CRTs, etc.).

A photographic element provided with a processing-solution-permeable overcoat, as described above, overlying the silver halide emulsion layer superposed on a support, can be developed in an alkaline developer solution having a pH greater than 7, preferably greater than 8. This allows the developer to penetrate the protective coating. After the pH is reduced, for example in a bleach fix solution, the protective overcoat becomes relatively water resistant. The addition of a hydrophilic polymer such as polyvinyl alcohol facilitates this method. It has been found the polyvinyl alcohol can provide improved wettability of the surface during processing and, at the same time, allows more of the polyvinyl alcohol to be washed out during the processing, so that the final product is more water resistant. In such an embodiment suitably at least 30%, preferably greater than 50%, more preferably greater than 75% of the original amount of hydrophilic polymer in the overcoat is washed out during processing of the exposed photographic element, such that the final product is depleted in hydrophilic polymer and hence relatively more water resistant. Although the processing-solution-permeable overcoat does not require fusing, optional fusing may improve the water resistance further.

The present invention is illustrated by the following examples. Unless otherwise indicated, the particle sizes herein are averages as determined by photon correlation spectroscopy.

EXAMPLES

Preparation of Epoxy Particles According to the Method of the Present Invention

P1 (Epoxy Dispersion):

An organic phase was made by dissolving 270 grams of Carboset® 525 acrylic coplymer (BF Goodrich Specialty Chemicals) followed by 630 grams of Epon® 1001F epoxy resin (Shell Chemical Co.), in 2100 grams of a 90:10 solvent mixture of ethyl acetate and acetone. 1000 grams of the organic phase was then added with 40 grams of isopropanol and neutralized with 19.5 grams of triethyl amine. An aqueous phase was prepared by mixing 220 grams of a 10% Alkanol® XC surfactant solution with 37 grams of a 30% poly(vinyl alcohol) solution (Aldrich, Cat. No. 36,062-7) and 1943 grams of water. The neutralized organic and aqueous phases were mixed and passed through a microfluidizer for 5 passes at 3500 psi. Volatile solvents were stripped from the dispersed mixture by purging the space above the dispersion with nitrogen at 35° C. or by removing with a rotary evaporator. The resulting dispersion was approximately 14% solids, and had a particle size of 250 nm and a Tg of 44° C.

P2 (Epoxy Dispersion):

This dispersion was made in a similar fashion to P1 but used 15 grams of Carboset® 526 and 135 grams of an epoxy resin sold by Aldrich Chemical Company under Catalog Number 40,804-2. The resulting dispersion had a particle size of 250 nm and a Tg of 38° C.

P3 (Epoxy Dispersion)

An organic phase was made by dissolving 280 grams of Carboset® 525 acrylic coplymer (BF Goodrich Specialty Chemicals) followed by 655 grams of Epon® 1001F epoxy resin (Shell Chemical Co.), in 2245 grams of a 90:10 solvent mixture of ethyl acetate and acetone. The organic phase was then added with 788 grams of isopropanol and neutralized with 100 grams of 20% KOH solution. An aqueous phase was prepared by mixing 785 grams of a 10% Alkanol® XC surfactant solution with 103 grams of a 30% poly(vinyl alcohol) solution (Aldrich, Cat. No. 36,062-7) and 5339 grams of water. The neutralized organic and aqueous phases were mixed and passed through a microfluidizer for 5 passes at 3500 psi. Volatile solvents were stripped from the dispersed mixture by purging the space above the dispersion with nitrogen at 65° C. The resulting dispersion was approximately 15% solids, and had a particle size of 175 nm and a Tg of 44° C.

P4 (Epoxy Disperson):

This dispersion was made in a similar fashion to P1 but used 15 grams of Carboset® 525 and 135 grams of Epon® 1001F epoxy resin (Shell Chemical Co.). The resulting dispersion had a particle size of less than 250 nm and a Tg of 45 ° C.

Additional Materials (1) Airvol® 203 poly(vinyl alcohol) (PVA) was obtained from Air Products which was 87 to 89% hydrolyzed (by hydrolyzed is meant that the acetate groups in the monomeric units are converted to hydroxy groups) and had a number-average molecular weight of 12,000 and a weight-average molecular weight of 35,000.

(2) Accusol® 882, a water-soluble associative thickener used as a viscosifying agent, commercially available from Rohm & Haas Chem. Co. (Philadelphia, Pa.).

Photographic Sample Preparation

Samples was prepared by coating in sequence blue-light sensitive layer, interlayer, green-light sensitive layer, UV layer, red-light sensitive layer, UV layer and overcoat on photographic paper support. The components in each individual layer are described below.

Blue Sensitive Emulsion (Blue EM-1). A high chloride silver halide emulsion is precipitated by adding approximately equimolar silver nitrate and sodium chloride solutions into a well stirred reactor containing glutaryldiaminophenyldisulfide, gelatin peptizer and thioether ripener. Cesium pentachloronitrosylosmate(II) dopant is added during the silver halide grain formation for most of the precipitation, followed by the addition of potassium hexacyanoruthenate(II), potassium (5-methylthiazole)-pentachloroiridate, a small amount of KI solution, and shelling without any dopant. The resultant emulsion contains cubic shaped grains having edge length of 0.6 $\mu$m. The emulsion is optimally sensitized by the addition of a colloidal suspension of aurous sulfide and heat ramped to 60° C. during which time blue sensitizing dye BSD-4, potassium hexchloroiridate, Lippmann bromide and 1-(3-acetamidophenyl)-5-mercaptotetrazole were added.

Green Sensitive Emulsion (Green EM-1): A high chloride silver halide emulsion is precipitated by adding approximately equimolar silver nitrate and sodium chloride solutions into a well stirred reactor containing, gelatin peptizer and thioether ripener. Cesium pentachloronitrosylosmate(II) dopant is added during the silver halide grain formation for most of the precipitation, followed by the addition of potassium (5-methylthiazole)-pentachloroiridate. The resultant emulsion contains cubic shaped grains of 0.3 $\mu$m in edge length size. The emulsion is optimally sensitized by the addition of glutaryldiaminophenyldisulfide, a colloidal suspension of aurous sulfide and heat ramped to 55° C. during which time potassium hexachloroiridate doped Lippmann bromide, a liquid crystalline suspension of green sensitizing dye GSD-1, and 1-(3-acetamidophenyl)-5-mercaptotetrazole were added.

Red Sensitive Emulsion (Red EM-1): A high chloride silver halide emulsion is precipitated by adding approximately equimolar silver nitrate and sodium chloride solutions into a well stirred reactor containing gelatin peptizer and thioether ripener. During the silver halide grain formation, potassium hexacyanoruthenate(II) and potassium (5-methylthiazole)-pentachloroiridate are added. The resultant emulsion contains cubic shaped grains of 0.4 $\mu$m in edgelength size. The emulsion is optimally sensitized by the addition of glutaryldiaminophenyldisulfide, sodium thiosulfate, tripotassium bis{2-[3-(2-sulfobenzamido)phenyl]-mercaptotetrazole} gold(l) and heat ramped to 64° C. during which time 1-(3-acetamidophenyl)-5-mercaptotetrazole, potassium hexachloroiridate, and potassium bromide arc added. The emulsion is then cooled to 40° C., pH adjusted to 6.0 and red sensitizing dye RSD-1 is added.

Coupler dispersions were emulsified by methods well known in the art. The following imaging layers were coated in sequence on polyethylene-laminated photographic paper.

| Layer | Item | Laydown (mg/ft$^2$) |
| --- | --- | --- |
| Layer 1 | Blue Sensitive Layer | |
| | Gelatin | 122.0 |
| | Blue sensitive silver (Blue EM-1) | 22.29 |
| | Y-4 | 38.49 |
| | ST-23 | 44.98 |
| | Tributyl Citrate | 20.24 |
| | ST-24 | 11.25 |
| | ST-16 | 0.883 |
| | Sodium Phenylmercaptotetrazole | 0.009 |
| | Piperidino hexose reductone | 0.2229 |
| | 5-chloro-2-methyl-4-isothiazolin-3-one/2-methyl-4-isothiazolin-3-one(3/1) | 0.019 |
| | SF-1 | 3.40 |
| | Potassium chloride | 1.895 |
| | Dye-1 | 1.375 |

| | | |
|---|---|---|
| Layer 2 | Interlayer | |
| | Gelatin | 69.97 |
| | ST-4 | 9.996 |
| | Diundecyl phthalate | 18.29 |
| | 5-chloro-2-methyl-4-isothiazolin-3-one/2-methyl-4-isothiazolin-3-one(3/1) | 0.009 |
| | Catechol disulfonate | 3.001 |
| | SF-1 | 0.753 |
| Layer 3 | Green Sensitive Layer | |
| | Gelatin | 110.96 |
| | Green sensitive silver (Green EM-1) | 9.392 |
| | M-4 | 19.29 |
| | Oleyl Alcohol | 20.20 |
| | Diundecyl phthalate | 10.40 |
| | ST-1 | 3.698 |
| | ST-3 | 26.39 |
| | Dye-2 | 0.678 |
| | 5-chloro-2-methyl-4-isothiazolin-3-one/2-methyl-4-isothiazolin-3-one(3/1) | 0.009 |
| | SF-1 | 2.192 |
| | Potassium chloride | 1.895 |
| | Sodium Phenylmercaptotetrazole | 0.065 |
| Layer 4 | M/C Interlayer | |
| | Gelatin | 69.97 |
| | ST-4 | 9.996 |
| | Diundecyl phthalate | 18.29 |
| | Acrylamide/t-Butylacrylamide sulfonate copolymer | 5.026 |
| | Bis-vinylsulfonylmethane | 12.91 |
| | 3,5-Dinitrobenzoic acid | 0.009 |
| | Citric acid | 0.065 |
| | Catechol disulfonate | 3.001 |
| | 5-chloro-2-methyl-4-isothiazolin-3-one/2-methyl-4-isothiazolin-3-one(3/1) | 0.009 |
| Layer 5 | Red Sensitive Layer | |
| | Gelatin | 125.96 |
| | Red Sensitive silver (Red EM-1) | 17.49 |
| | IC-35 | 21.59 |
| | IC-36 | 2.397 |
| | UV-1 | 32.99 |
| | Dibutyl sebacate | 40.49 |
| | Tris(2-ethylhexyl)phosphate | 13.50 |
| | Dye-3 | 2.127 |
| | Potassium p-toluenethiosulfonate | 0.242 |
| | 5-chloro-2-methyl-4-isothiazolin-3-one/2-methyl-4-isothiazolin-3-one(3/1) | 0.009 |
| | Sodium Phenylmercaptotetrazole | 0.046 |
| | SF-1 | 4.868 |
| Layer 6 | UV Overcoat | |
| | Gelatin | 76.47 |
| | UV-2 | 3.298 |
| | UV-1 | 18.896 |
| | ST-4 | 6.085 |
| | SF-1 | 1.162 |
| | Tris(2-ethylhexyl)phosphate | 7.404 |
| | 5-chloro-2-methyl-4-isothiazolin-3-one/2-methyl-4-isothiazolin-3-one(3/1) | 0.009 |
| Layer 7 | SOC | |
| | Gelatin | 60.0 |
| | SF-1 | 1.0 |
| | SF-2 | 0.39 |

BSD-4

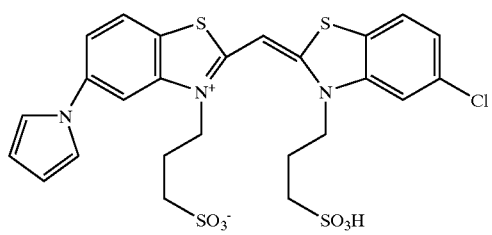

-continued
GSD-1
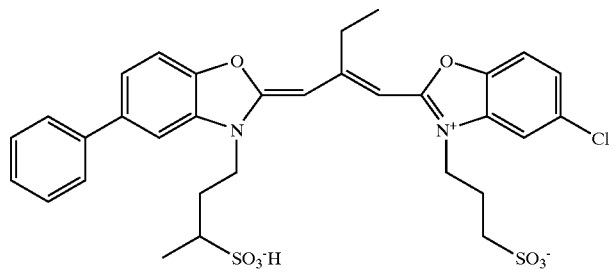
RSD-1
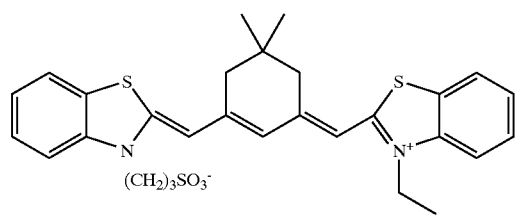
Y-4
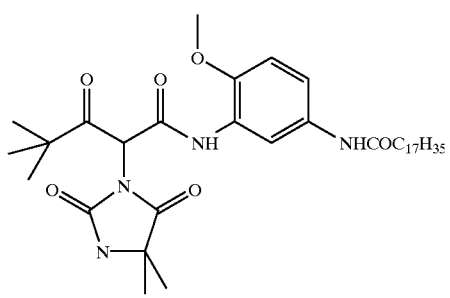
M-4
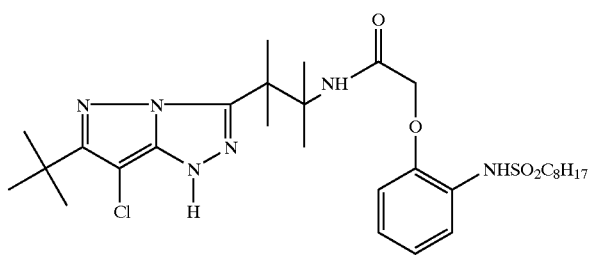
IC-35
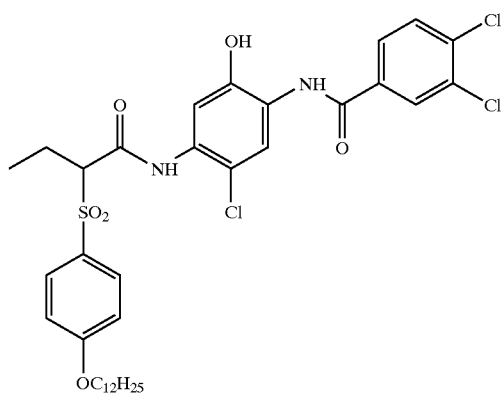

-continued
IC-36
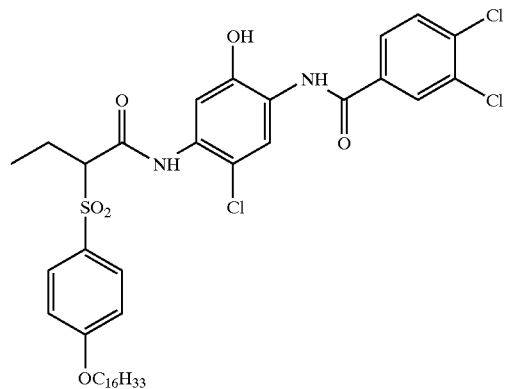
Dye-1
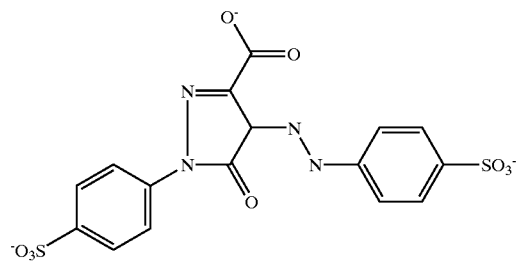
Dye-2
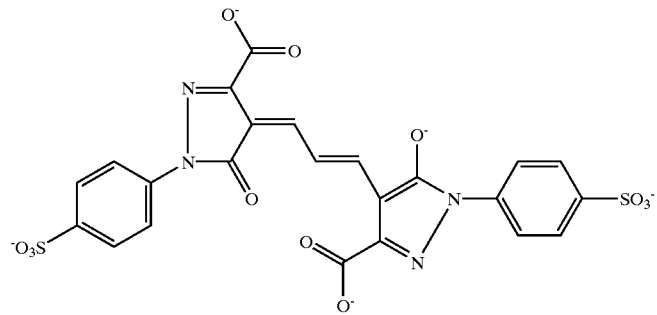
Dye-3
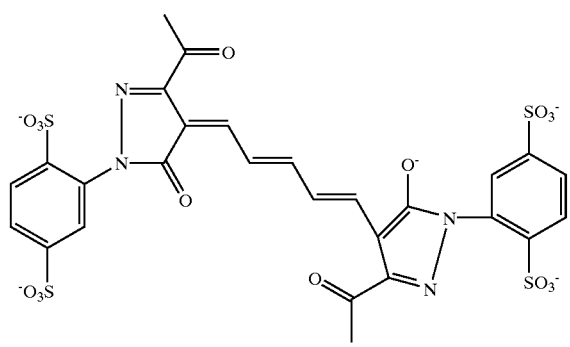
ST-1
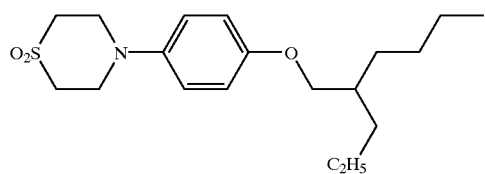

-continued
ST-3 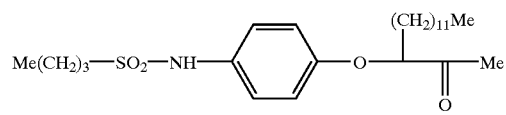
ST-4 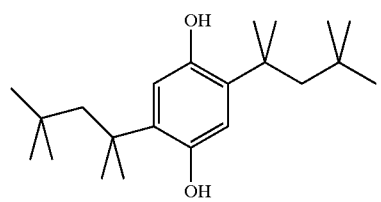
ST-16 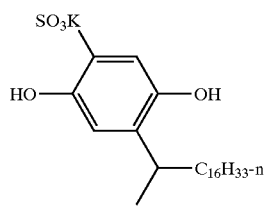
ST-23 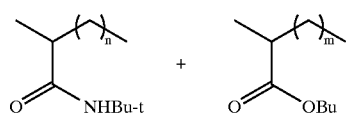
n:m = 1:1; MW = 75,000–100,000
ST-24 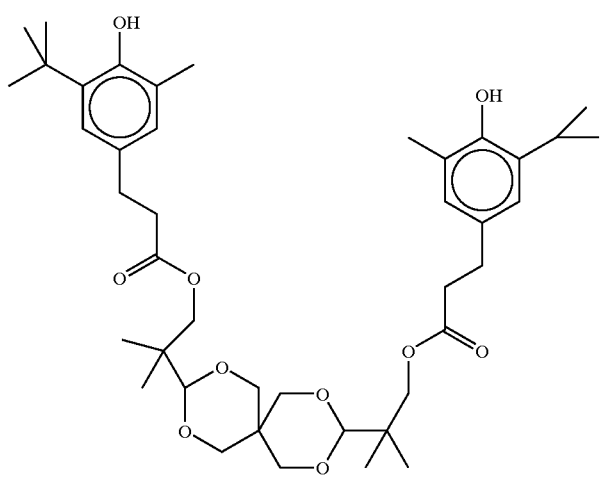
UV-1 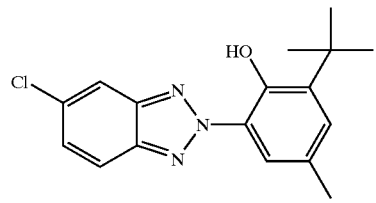

UV-2

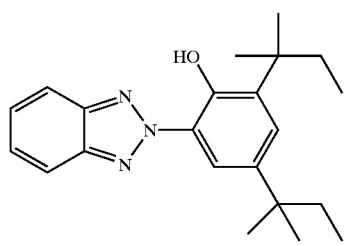

SF-1

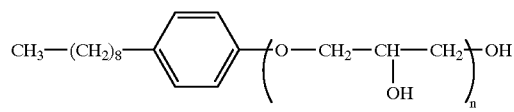

SF-2

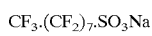

Test for Water Resistance:

Aqueous solutions of Ponceau Red dye are known to stain gelatin through ionic interaction and therefore are used to test water resistance of the overcoats. Ponceau Red dye solution was prepared by dissolving 1 gram dye in 1000 grams mixture of acetic acid and water (5 parts: 95 parts). Samples, without being exposed to light, were processed through the Kodak RA4 process to obtain white Dmin samples. The water resistance test was done by placing a drop of the dye solution on the sample for 10 minutes followed by a 30-second water rinse to removed excess dye solution on the coating surface. Each sample was then air dried, and status A reflectance density on the spotted area was recorded. Assuming that the optical density of a Dmin check image with no protective overcoat corresponds to 0% water resistance and that an optical density of 0 corresponds to 100% water resistance, the percent water resistance for a sample is calculated using the following equation. Percent water resistance=100[1-(status A density of sample/status A density of check)]

Example 1

Color photographic paper samples were prepared by replacing the standard gelatin-containing overcoat with the coating compositions comprising an aqueous dispersion of epoxy-functional particles made according to the invention, as described in Table 1 below.

TABLE 1

| ID | Overcoat Composition (in mg/sq. ft.) | Note | % Water resistance after standard processing |
|---|---|---|---|
| 1-1 | 60 gelatin | Comparison | 0 |
| 1-2 | 140 P4 25 PVA | Invention | 80 |
| 1-3 | 140 P4 25 PVA 15 Accusol 882 thickener | Invention | 99 |
| 1-4 | 140 P1 55 PVA 15 Accusol 882 thickener | Invention | 99 |
| 1-5 | 140 P2 25 PVA | Invention | 80 |

TABLE 1-continued

| ID | Overcoat Composition (in mg/sq. ft.) | Note | % Water resistance after standard processing |
|---|---|---|---|
| 1-6 | 140 P2 25 PVA 10 Accusol ® 882 thickener | Invention | 85 |
| 1-7 | 140 P3 55 PVA 13 Accusol ® 882 thickener | Invention | 99 |
| 1-8 | 160 P3 55 PVA 15 Accusol ® 882 | Invention | 99 |
| 1-9 | 140 P1 35 PVA 13 Accusol ® 882 thickener | Invention | 99 |
| 1-10 | 140 P1 35 PVA 17 Accusol ® 882 thickener | Invention | 99 |

Samples were placed in a differential scanning calorimeter (DSC) and tested up to a temperature of 100° C. Based on the absence of an exothermic peak characteristic of chemical reaction, it was concluded that there was substantially no chemical reaction of the epoxy functionalities within the particles of this invention within this temperature range.

It is evident from Table 1 that the use of the aqueous dispersions made according to the present inventive are useful in overcoat compositions to improve the water resistance relative to a conventional gelatin overcoat.

Example 2

In this example, the following epoxy dispersions Epoxy-1 through Epoxy-7 were prepared according to the present invention:

Epoxy-1: An oil phase was prepared by dissolving in 42 grams of ethyl acetate 1.5 grams of Carboset® 526 (an acrylic resin from B. F. Goodrich with an acid number of about 100), 12 grams of EPON™ 1001F (m.p. 60 to 70° C.), 0.12 grams of 2-undecylimidazole, 2 grams of acetone, 2 grams of isopropyl alcohol, and 0.24 g of triethyl amine. The prepared oil phase was added to an aqueous phase containing 198 grams of water and 2 grams of Alkanol® XC surfactant under stirring to form an emulsion. The resultant emulsion was then passed three times through a Microfluidizer® mixer. Finally the volatile solvents were removed at room temperature under a stream of nitrogen. The resultant epoxy particle has a polymer (Carboset® 526) to epoxy resin of 12.5:87.5 and a mean particle size of about 124.5 nm.

Epoxy-2: Epoxy-2 was prepared in a similar manner as Epoxy-1 except that it has a polymer (Carboset® 526) to epoxy resin of 1:4 and a mean particle size of about 113 nm.

Epoxy-3: Epoxy-3 was prepared in a similar manner as Epoxy-1 except that EPON® 1002F was used and that the particle has a polymer (Carboset® 526) to epoxy resin of 1:4 and a mean particle size of about 112.6 nm.

Epoxy-4: Epoxy-4 was prepared in a similar manner as Epoxy-1 except the particle contains 2 times the amount of the imidazole catalyst and has a mean size of about 145 nm.

Epoxy-5: Epoxy-5 was prepared in a similar manner as Epoxy-1 except that the particle has a polymer (Carboset® 526) to epoxy resin of 1:1 and a mean particle size of about 187 nm.

Epoxy-6: An oil phase was prepared by dissolving in 42 grams of ethyl acetate 3 grams of Carboset® 525 (an acrylic resin from B. F. Goodrich with an acid number of about 75), 12 grams of EPON™ 1001F (m.p. 60 to 70° C.), 2 grams of AOT® surfactant, 0.12 grams of 2-undecylimidazole, 2 grams of acetone, 2 grams of isopropyl alcohol, and 0.35 g of triethyl amine. The prepared oil phase was added to an aqueous phase containing 200 grams of water under stirring to form an emulsion. The resultant emulsion was then passed three times through a Microfluidizer®. Finally the volatile solvents were removed at room temperature under a stream of nitrogen. The resultant epoxy particle has a polymer (Carboset® 525) to epoxy resin of 1:4 and a mean particle size of about 92 nm.

Epoxy-7: An oil phase was prepared by dissolving in 45 grams of ethyl acetate and acetone (90:10) 3 grams of Carboset® 526 (an acrylic resin from B. F. Goodrich with an acid number of about 100), 12 grams of EPON™ 1001F (m.p. 60 to 70° C.), 2 grams of AOT® surfactant, 0.12 grams of 2-undecylimidazole, 2 grams of isopropyl alcohol, and 0.49 g of triethyl amine. The prepared oil phase was added to 180 grams of water under stirring to form an emulsion. The resultant emulsion was then passed five times through a Microfluidizer® mixer. 18.4 grams of a 10% Alkanol® XC surfactant solution was added to the emulsion. Finally the volatile solvents were removed at room temperature under a stream of nitrogen. The resultant polymer particle has a polymer to epoxy ratio of 1:4 and a mean particle size of about 206 nm.

Com-1: An oil phase was prepared by dissolving in 125.5 grams of ethyl acetate 60 grams of EPON™ 1001F (m.p. 60 to 70° C.), 0.6 grams of 2-undecylimidazole, and 14 grams of acetone. The prepared oil phase was added to an aqueous phase containing 768 grams of water, 8 grams of Alkanol® XC surfactant, and 24 grams of poly(vinyl pyrrolidone) (K-30® from International Specialty Products) under stirring to form an emulsion. The resultant emulsion was then passed three times through a Microfluidizer® mixer. Finally the volatile solvents were removed at room temperature under a stream of nitrogen. The resultant epoxy particle has a mean particle size of about 100.4 nm.

Example 3

This example demonstrates that the epoxy particles made according to the invention are self-curable. Dispersions Epoxy-1, Epoxy-3, and Epoxy-5, as described in previous Example 2, were dried at room temperature to give clear coatings. The curing reaction was monitored by DSC (differential scanning calorimetry) to identify the glass transition temperature, the onset of curing reaction, and the change in glass transition temperature as a function of heating cycles (10° C./min). Epon® 1001F, 1002F, Carboset® 526, and Com-1, as described in the previous example, were used as the comparative examples. The results are listed in Table 2 below.

TABLE 2

| ID/Epoxy | Reaction Onset, ° C. | Glass Transition Temperature, ° C. | | | | |
|---|---|---|---|---|---|---|
| | | 1$^{st}$ heat | 2$^{nd}$ heat | 3$^{rd}$ heat | 4$^{th}$ heat | 5$^{th}$ heat |
| No. 2-1 Epoxy-1 | 103 Exothermic peak observed | 46 | 65.3 | 85 | 93 | 102.3 |
| No. 2-2 Epoxy-3 | 100 Exothermic peak observed | 47.5 | 73.9 | 86.6 | 92.7 | 102.4 |
| No. 2-3 Epoxy-5 | 120 Exothermic peak observed | 42.4 | 67 | 87.2 | 89.5 | 93.6 |
| No. 2-4 Epon® 1001F | No exothermic peak | 35.8 | 38.1 | 38.4 | — | — |
| No. 2-5 Epon® 1002F | No exothermic peak | 48.5 | 45 | 45.7 | — | — |
| No. 2-6 Carboset® 526 | No exothermic peak | 60.4 | 67.3 | 72.8 | 76.3 | 75.5 |
| No. 2-7 Com-1 | No exothermic peak | 42.3 | 49.8 | 66.4 | — | — |

The invention has been described in detail with particular reference to certain preferred embodiments thereof, but it will be understood that variations and modifications can be effected within the spirit and scope of the invention.

What is claimed is:

1. A method of making an aqueous dispersion of epoxy-functional particles for use in an aqueous coating composition, said method comprising:
    (a) dissolving into a volatile solvent mixture an epoxy-functional resin and a polymer having an acid number between 30 and 200, wherein the volatile solvent mixture comprises a water-immiscible organic solvent as the major component and a water-miscible organic solvent as a minor component;
    (b) adding to the organic solvent medium a base to neutralize the acid groups to a degree of neutralization less than 95%;
    (c) subjecting the resulting organic phase to means for dispersing said organic phase into an aqueous medium; and
    (d) removing the volatile solvent mixture;
    wherein the temperature of steps (a) through (b) is maintained such that epoxy functionality in the particles is substantially unreacted, and the average particle size of the epoxy-functional particles in the dispersion is less than about 500 nm.

2. The method of claim 1 wherein, in step (a), (b) and (c) the temperature is essentially maintained at a temperature of under about 50° C., such that the epoxy functionality remains substantially unreacted.

3. The method of claim 1 wherein, in step (d), the temperature is maintained at a temperature under about 100° C. such that the epoxy functionality remains substantially unreacted.

4. The method of claim 1 wherein, in step (d), volatiles are removed by heating.

5. The method of claim 1 wherein the volatile solvent mixture comprises at least 80 percent by volume of a water immiscible organic solvent, wherein water immiscible means the solubility in water is less than 3% by volume.

6. The method of claim 1 wherein the volatile solvent mixture comprises at less than 20 percent by volume of a water miscible organic solvent, wherein water miscible means the solubility in water is at least 10 percent.

7. The method of claim 1 wherein the immiscible organic solvent is selected from the group consisting of ethyl acetate and methyl ethyl ketone.

8. The method of claim 1 wherein the miscible organic solvent is selected from the group consisting of acetone, isopropyl alcohol, butyl alcohol, methyl alcohol, etc.

9. The method of claim 1 wherein the volatile solvent mixture comprises a surfactant.

10. The method of claim 1 wherein the epoxy-functional resin is a diglycidyl ether of a dihydric phenol.

11. The method of claim 1 wherein the polymer comprises an acid monomer selected from the group consisting of an ethylenically unsaturated acid, mono-protic or diprotic, anhydride or monoester of a dibasic acid.

12. The method of claim 1 wherein the polymer comprises a monomer selected from the group consisting of acrylic acid, methacrylic acid, and itaconic acid.

13. A method of making an aqueous coating composition comprising:
  (a) dissolving into a volatile solvent mixture an epoxy-functional resin and a polymer having an acid number between 30 and 200, wherein the volatile solvent mixture comprises a water-immiscible organic solvent as the major component and a water-miscible organic solvent as a minor component;
  (b) adding to the organic solvent medium a base to neutralize the acid groups to a degree of neutralization less than 95%;
  (c) subjecting the resulting organic phase to means for dispersing said organic phase into an aqueous medium; and
  (d) removing the volatile solvent mixture; and
  (e) optionally combining the dispersion with a polymeric binder;
  wherein the temperature of steps (a) through (b) is maintained such that epoxy functionality in the particles is substantially unreacted, and the average particle size of the epoxy-functional particles in the dispersion is less than about 500 nm.

14. The method of claim 13 comprising combining the dispersed polymers of (d) with a polymeric binder.

15. The method of claim 14 wherein the polymeric binder is water soluble or water dispersible.

16. The method of claim 14 wherein the weight ratio of the water-dispersible epoxy-containing particles in the coating composition is at least 10% by dry weight of the composition.

17. The method of claim 13 wherein the coating composition further comprises UV absorbers, surfactants, emulsifiers, coating aids, lubricants, matte particles, rheology modifiers, crosslinking agents, antifoggants, inorganic fillers, pigments, magnetic particles and/or biocides.

18. The method of claim 13 wherein the epoxy material is an epoxy resin that is a diglycidyl ether of a dihydric phenol.

19. The method of claim 13 wherein the polymer comprises an acid monomer selected from the group consisting of an ethylenically unsaturated acid, mono-protic or diprotic, anhydride or monoester of a dibasic acid.

* * * * *